(12) United States Patent
Karlsen

(10) Patent No.: US 10,815,140 B2
(45) Date of Patent: Oct. 27, 2020

(54) SYSTEM AND METHOD FOR TREATING AND RECYCLING PROCESS WATER

(71) Applicant: Redox AS, Averøy (NO)

(72) Inventor: Bjørn Karlsen, Kristiansund (NO)

(73) Assignee: Redox AS, Averoy (NO)

( * ) Notice: Subject to any disclaimer, the term of this patent is extended or adjusted under 35 U.S.C. 154(b) by 0 days.

(21) Appl. No.: 16/307,843

(22) PCT Filed: Jun. 2, 2017

(86) PCT No.: PCT/NO2017/050144
§ 371 (c)(1),
(2) Date: Dec. 6, 2018

(87) PCT Pub. No.: WO2017/213514
PCT Pub. Date: Dec. 14, 2017

(65) Prior Publication Data
US 2019/0256393 A1 Aug. 22, 2019

(30) Foreign Application Priority Data
Jun. 7, 2016 (NO) .................................... 20160976

(51) Int. Cl.
*C02F 9/00* (2006.01)
*B01D 21/00* (2006.01)
(Continued)

(52) U.S. Cl.
CPC ............ *C02F 9/00* (2013.01); *B01D 21/0036* (2013.01); *B01D 21/0084* (2013.01);
(Continued)

(58) Field of Classification Search
CPC ............ B01D 21/0036; B01D 21/0084; B01D 21/265; B01D 2311/04; B01D 2311/2619;
(Continued)

(56) References Cited

U.S. PATENT DOCUMENTS 5,462,669 A * 10/1995 Yeh ........................ B01D 17/00
  210/703
6,488,853 B1 * 12/2002 Mullerheim ........... B01D 61/16
  210/615

(Continued)

OTHER PUBLICATIONS

International Search Report and Written Opinion dated Sep. 6, 2017 (PCT/N02017/050144).

*Primary Examiner* — Sharon Pregler
(74) *Attorney, Agent, or Firm* — Alix, Yale & Ristas, LLP

(57) ABSTRACT

A system and a method for treating and recycling process water has a cylindrical sedimentation tank and a cylindrical tank for flotation and storage downstream of the sedimentation tank. Water is added to an inlet at the upper part of the sedimentation tank, and treated water is removed from an outlet at the lower part of the flotation tank for recycling. A screw in the sedimentation tank has a major diameter similar the sedimentation tank, which forces water to flow rotationally from the top towards the bottom of the sedimentation tank. A riser between the sedimentation tank and the flotation tank with one end in a lower part of the sedimentation tank, and the other end at an upper part of the flotation tank. A cleaning loop with ozone added is between the tanks, removing water from the flotation tank and returning it to the sedimentation tank.

17 Claims, 1 Drawing Sheet

(51) Int. Cl.
 B01D 21/26 (2006.01)
 B03D 1/24 (2006.01)
 C02F 1/24 (2006.01)
 C02F 1/78 (2006.01)
 C02F 1/00 (2006.01)
 C02F 103/44 (2006.01)

(52) U.S. Cl.
 CPC ............ B01D 21/265 (2013.01); B03D 1/247 (2013.01); *C02F 1/24* (2013.01); *C02F 1/78* (2013.01); *C02F 2001/007* (2013.01); *C02F 2103/44* (2013.01); *C02F 2301/026* (2013.01); *C02F 2301/046* (2013.01); *C02F 2303/04* (2013.01)

(58) Field of Classification Search
 CPC ........ B01D 2311/2661; B01D 2311/12; B01D 2311/13; B01D 61/025; B01D 61/145; B01D 61/147; B01D 61/16; B01D 17/00; B01D 17/0205; B01D 17/0217; B03D 1/028; B03D 1/14; B03D 1/1412; B03D 1/1418; B03D 1/1431; B03D 1/1462; B03D 1/1468; B03D 1/1493; B03D 1/247
 See application file for complete search history.

(56) References Cited

U.S. PATENT DOCUMENTS

| | | | |
|---|---|---|---|
| 2005/0109697 A1* | 5/2005 | Olivier .................. | C02F 3/00 210/610 |
| 2019/0256393 A1* | 8/2019 | Karlsen .................. | C02F 9/00 |

* cited by examiner

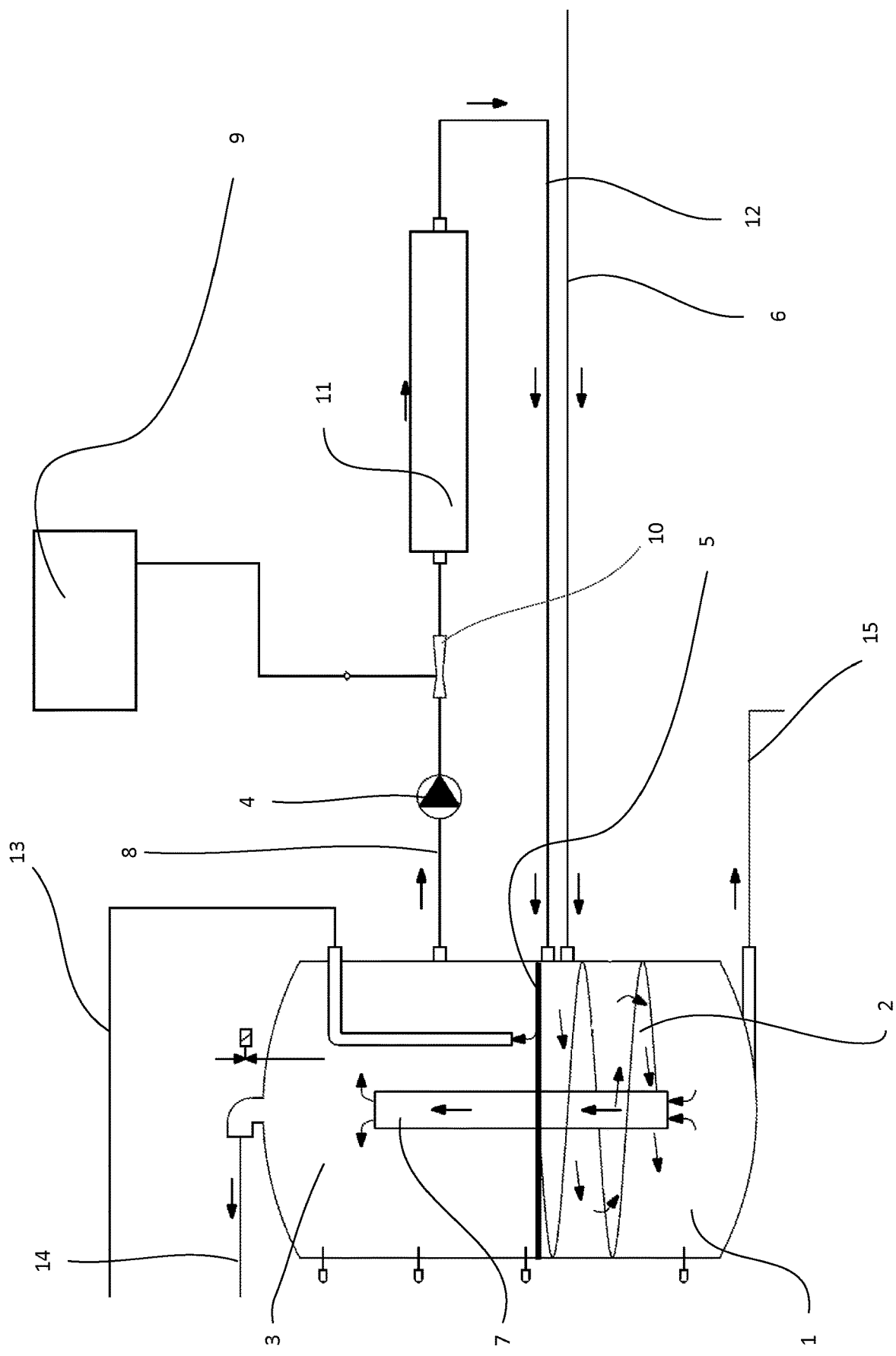

SYSTEM AND METHOD FOR TREATING AND RECYCLING PROCESS WATER

BACKGROUND

The disclosed embodiments relate to a system for treating and recycling process water, and a method for treating and recycling process water.

Water is becoming scarce in many areas of the world. With few possibilities to expand the water supply, and increasing consumption, the need for purification of waste water is expanding. The degree of water purification will depend on the extent to which the water is contaminated and the ultimate use of the treated water. Water intended for human or animal consumption or contact will require a higher degree of purification than water that is intended for the purpose of toilet flushing, laundry use, garden and agricultural irrigation, and many industrial processes.

Process water from industrial processes may include chemicals, salts, minerals and the similar which makes it advantageous to recycle the water.

When washing a car, several hundred litres of water is needed, and often also a lot of chemicals. Even more water is needed to wash a trailer, truck or the similar, and the water may be expensive, in some areas the access to water may be limited, and thus the water should preferably be recycled within the plant. The water needs to be purified before it is used again, and sand and other particles must be removed, or they may cause damage to the car when the water is recycled.

The traditional way of treating and possibly recycling waste water within a car wash plant is by using sand traps, sludge treatment tanks and chemicals. In WO 2006131593 it is described a system for purification of wastewater using both sedimentation and flotation. Such treatment requires a lot of space, and the time needed before the water may be used again is several hours. Even when such plants are working optimal, the water will be too dirty to be used after a few cycles, it will smell and contain too many bacteria. Thus, the water needs to be treated further or replaced.

It is tried to use ozone to treat the water in order to reduce the amount of bacteria, and the time needed to recycle the water. Such plants are for instance described in WO 2009/135249, US2009/0272681 and US 2008/0023407. However, the plants comprise several tanks and steps in order to purify the water, and thus the recycling time will be long.

SUMMARY

The disclosure provides a new method and system for purifying and recycling process water, wherein the system recycles the main share of the water. In the disclosed embodiments, the time needed to recycle the water is sufficiently short to keep or increase the capacity of the system yet reducing the necessary space compared to known systems. In the disclosed embodiments, the water is sufficiently purified to be used several times, and the system to purify the water is easy to maintain and clean. The disclosed embodiments also allow a reduction in the close down of the system due to maintenance and service compared to systems of prior art.

In one embodiment, a system for treating and recycling process water, comprises a cylindrical sedimentation tank and a cylindrical tank for flotation and storage downstream of the sedimentation tank, wherein water to be treated is flowing into an inlet at an upper part of the sedimentation tank, and water to be recycled is removed from an outlet at a lower part of the flotation tank. The sedimentation tank comprises a screw having a major diameter similar to the inner diameter of the sedimentation tank, which forces the water to flow rotationally from the top towards the bottom of the sedimentation tank. A riser is arranged between the sedimentation tank and the flotation tank, one end of the riser is in a lower part of the sedimentation tank, and the other end is in an upper part of the flotation tank. A cleaning loop is arranged between the tanks, removing water from the flotation tank and returning the water to the sedimentation tank, wherein ozone is added to the loop.

By "process water" it is in this application, meant water which is not considered drinkable (not drinking water) and is basically used in relation to industrial plants, industrial processes and production facilities. Even if the water is not considered drinkable, it may be used in the food sector. Both brine used in food production, such as production of cheese, and water from a car wash plant washing vehicles and the similar, may be treated and recycled by the system according to the disclosed embodiments, and is included in the expression "process water".

Preferably, the screw in the sedimentation tank has an even shank with a helical thread along its whole length. The crest of the screw threads is preferably bearing against the inside of the sedimentation tank, and more preferably the opening between the crest of the threads and the inside of the tank is sealed. In this way the water entering the inlet at the upper part of the sedimentation tank, will be forced to flow on the threads of the screw, and thus a rotational flow is achieved.

The thread angle and the distance between the root and the crest of the threads may vary depending on the type and amount of water to be treated, and the size and design of the sedimentation tank. Further, the upper end of the screw should be as close as possible to the inlet of the tank, and the lower end should be close to the bottom of the tank but yet in a distance from the bottom, to allow any sediment at the bottom to settle. The screw is preferably stationary in the sedimentation tank, meaning that it does not move in relation to the sedimentation tank, and does not rotate.

The inlet to the system is in the upper part, preferably in the upper part of a wall of the sedimentation tank, and any water flowing through the inlet will be led onto the threads of the screw. The outlet of the system is in the lower part of the flotation tank. The outlet should be close to, but not in the bottom of the tank, in such a way that if any sediments settle in the flotation tank, these will not be flowing into the outlet. The positioning of the outlet will be obvious to a person skilled in the art.

By "riser" it is herein meant a pipeline arranged in such a way that water will flow upwards against gravitation, when sufficient water is added to the system. When water is added to the inlet of the sedimentation tank, the water at the bottom will be forced to flow upwards and into the riser. In the disclosed embodiments, the riser is preferably arranged at the centre of the screw, meaning that the riser is inside the shank of the screw.

The riser is arranged from the lower part of the sedimentation tank to an upper part of the flotation tank. The inlet to the riser, being the outlet of the sedimentation tank, should preferably be in the centre of the rotational flow of water, close to the lower end of the screw. The water will be cleanest in this area, as the speed of the water will be a minimum, and the lower end of the screw will be as far away from any sediment at the bottom of tank, as possible.

The outlet of the riser should be underneath the water line when the system is running. This is both to avoid that the water flowing out of the riser is exposed to air, to avoid excessive foaming in the flotation tank, and to maintain the flotation in the tank. If the outlet of the riser is above the water line, water flowing out of the riser would flow downwards into the water in the tank, passing through the foam on the surface, and disturbing the flotation in the tank.

The distance from the bottom of the sedimentation tank to the inlet of the riser, and the distance from the outlet of the riser to the water line in the flotation tank will vary with the flow rate, which is obvious to a person skilled in the art.

In the cleaning loop arranged between the flotation and sedimentation tank, ozone is added to disinfect the water. The addition of ozone will create small bubbles and the water, possibly containing chemicals, may foam. Ozone is preferably added through an injector which promotes foaming by causing turbulent flow in the cleaning loop, and thus a mixture of water, bubbles and foam will enter the sedimentation tank.

In a more preferred embodiment, the cleaning loop comprises a tank for homogenizing the foam, after the addition of ozone. The tank should be designed for pressure release and pressure increase, as this will homogenize and preferably minimize the bubbles, and foam having small bubbles of equal shape will be created. The foam will facilitate the removal of particles in the water by flotation, but it is preferred that the foam and bubbles are flowing with the water through the sedimentation tank and riser until it enters the flotation tank, and that flotation only occurs in the flotation tank.

When foam and bubbles are covering the surface of the water in the flotation tank, they will prevent degassing of the water. Further, when the upper end of the riser is below the water line, degassing of the water added to the flotation tank will be prevented. The ozone dissolved in the water will thus retain in the water longer, and the effect of the ozone will be improved. When the system is running, the water line in the flotation tank must be in the upper part above the outlet of the riser, but yet leaving sufficiently space for foam and bubbles to avoid degassing and to achieve flotation and removal of small particles.

The flotation tank should have an outlet to remove any foam and flotation sludge from the top of the flotation tank, and the sedimentation tank should be designed in order to remove any sediment from the bottom. This may be performed in many ways which is obvious to a person skilled in the art, and is thus not described any further here.

In an alternative embodiment, the flotation tank may be filled partly or in whole with a packing material, to promote flotation. In the same way, the surface of the threads of the screw in the sedimentation tank may be covered with a material promoting sedimentation. Materials of such kind are well known in the art, and it will be obvious to a person skilled in the art to find the suitable materials.

In a preferred embodiment, the riser enters the bottom of the flotation tank at the centre and the outlet is centred in the upper part, under the water line as described above. In a more preferred embodiment, the flotation tank is arranged directly above the sedimentation tank, and thus the riser is straight. In an even more preferred embodiment, the flotation tank is an upper part, and the sedimentation tank is a lower part of the same container, the tanks are separated by a water proof seal. This arrangement may be space saving.

There might be times where no process water to be treated is added to the system. Then the system is still running, but at slower rate, as the only water removed from the flotation tank is running into the cleaning loop, and the only water added to the sedimentation tank is from the cleaning loop. The flotation tank is therefore also the storage tank before the water is recycled.

Depending on the type of process water, the water to be treated and recycled may be led through an oil/silt separator before it enters the system according to the disclosure.

Also disclosed is a method for treating and recycling process water using a system as described above. The method comprises the following steps:
receiving process water from a process,
transferring the received process water to the sedimentation tank,
allowing the water to rotate in the sedimentation tank, and any particles of the water to settle,
allowing the water to rise in the riser, and flow out into an upper part of the flotation tank,
transferring a part of the water from the flotation tank to the cleaning loop, adding ozone to the water in the loop, and returning the water to the upper part of the sedimentation tank,
recycling water from the bottom of the flotation tank to the process.

The method may also comprise a step for allowing the water to foam in a foaming tank, after the ozone is added to the cleaning loop.

The method may also comprise a step for collecting the water from an oil and silt separator.

BRIEF DESCRIPTION OF THE DRAWING

The invention will be described with reference to FIG. 1, showing a flow diagram of a system for treating and recycling process water according to the present invention.

DETAILED DESCRIPTION

The different parts of FIG. 1 are not necessarily in scale to each other, as the diagram is merely for illustrating the invention.

The following description of an exemplary embodiment refers to FIG. 1, and the following detailed description is not meant or intended to limit the invention.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

The shown system comprises a sedimentation tank 1 having an internal screw 2, a flotation tank 3, a pump 4 to circulate the water, and a cleaning loop wherein ozone is added. The sedimentation tank 1 and flotation tank 3 are arranged as lower and upper parts of the same container, separated by a floor 5, welded to the inside of the container. The flow of the water is indicated by arrows on the FIGURE.

The process water to be treated is pumped (not shown) into the sedimentation tank 1 through an inlet pipe 6. The water may contain particles, sludge and sediments and is led into the tank tangentially at low speed, and flows onto the threads of the screw 2.

At a distance from the bottom of the sedimentation tank 1, it is shown a riser 7 running through the centre of the screw 2, leading the water to the flotation tank 3. The upper end of the riser, being the outlet, is in the upper part of the flotation tank 3 and when the system is running, the water line should be above the outlet of the riser.

A part of the water is removed from the flotation tank in a cleaning pipe 8, and led into a cleaning loop, by an injector pump 4 which also circulates the water. Ozone is produced on site from oxygen in the air, by an ozone generator 9, and continuously added to the loop via an appropriate injector 10.

The process water, especially when coming from a washing area in a car wash plant, may contain a large amount of chemicals and particles and will foam strongly. In order to homogenize the foam it is used a foaming tank 11 using a combination of speed-change and dynamic pressure fall and pressure rise to stabilize the bubbles of the water and create bubbles of similar size. In the shown embodiment it is used a tank 11 having square ends, and once the water flows into the tank the pressure will release and bubbles will arise. When the water flows out of the tank, the pressure will rise again, and this will reduce and homogenize the size of the bubbles. Other tanks or reactors giving the same result may also be used, which will be obvious to a person skilled in the art.

The water in the cleaning loop, treated with ozone and containing bobbles, are flowing back into the sedimentation tank in a cleaning return pipe 12. The bubbles are an important part of the cleaning process as they remove particles and pollution by flotation, but also as they trap the ozone inside the water for optimal blending and increased contact period.

When the foaming water enters the sedimentation tank 1 and rotates at low speed, the bubbles will flow with the water, and enter the riser 7 to the flotation tank 3. When the water and foam flows out of the outlet of the riser, the foam and bubbles will rise and create foam on the surface. As the outlet is below the water line, excess foaming will be avoided.

Water is recycled to the process by return pipe 13, by removing water from the lower part of the flotation tank.

In the shown embodiment, the sedimentation tank has one level switch, and the flotation tank has three. These are used to ensure the correct water level of the tanks, giving signals when sediments and/or sludge must be removed etc. The number and location of the level switches may vary.

The foam on the surface of the flotation tank has entrapped pollution and will be removed at the top of the tank through the sludge pipeline 14. Any sediments at the bottom of the sedimentation tank will be removed by the sedimentation pipeline 15.

When treating and recycling process water using a system as shown in the FIGURE, the method comprises the following steps:

receiving process water from a process,
pumping the received water to the sedimentation tank 1, through the inlet pipe 6,
allowing the water to rotate on the threads of the screw 2 in the sedimentation tank, and any particles of the water to settle,
allowing the water to rise in the riser 7, and flow out of the riser, under the water line in the flotation tank 3,
pumping a part of the water from the flotation tank 3 to the cleaning loop, into the cleaning pipe 8, producing ozone by the ozone generator 9 and adding ozone to the cleaning pipe with an injector 10, allowing the water and ozone to create foam in the foaming tank 11, and returning the water to the upper part of the sedimentation tank in the cleaning return pipe 12,
recycling water from the lower part of the flotation tank to the process in the return pipe 13.

By the disclosed system and method, one achieves cleaner water by four methods:

A) An amount of ozone is added to the water to kill bacteria, virus, cysts and algae. The amount is adjusted to correspond to the water quality from the washing area. BOF, COF and turbidity is reduced. The miscolour of the water will also be reduced, as ozone has a bleaching effect.

B) Large amounts of dissolved oxygen is added to the water with the ozone. This will give "renewed life" to the water, and the sulphurous smell associated to old stagnant water will disappear.

C) By foaming the water, tiny particles and other pollutions being too small to sediment, will be removed as they attach to the small bobbles and are lifted out of the water by flotation.

D) Ozone has the effect that it releases molecules being attached to each other. Among the water molecules there will be large amounts of salts and minerals being chemically bound to each other, and which may not be filtered off or dissolved by means of disinfectant or other chemicals. By using ozone these will be released and the result will be clearer water and more predictable chemistry.

Example

An embodiment of the shown system is dimensioned for handling process water, being waste water from a plant cleaning 100 busses per day, being about 5 busses per hour. The sedimentation and flotation tank contains totally 2000 l water, and the amount of water needed to wash one buss is about 650 litre, being about 3250 l per hour. The pump for circulating the water is dimensioned to 6000 l/hour.

Ozone is produced and added at a rate of 18-36 gram per hour upon 10% concentration. The amount of ozone needed seems to vary both with time of the year and weather, but also with the amount and type of cleaning chemicals being used. Samples of the recycled water should be taken to adjust the amount of added ozone regularly. The retention time in the system is about 36 minutes when the plant is running at full speed, and the number of cleaning cycles is about 3 per hour.

By using a method and a system according to the present invention, 70-80% of the water being used for a car wash may be recirculated, which means that only ca 140 l water is removed and replaced from the system per wash. The water being removed is mainly water being left on the vehicles as they leave the plant, or evaporated water, and the fresh water being added should preferably be added in the last flushing of the car.

When the plant is operating at a speed of 100 busses per day, about 51.000 litres water is saved per day, by using the system and method according to the present invention. Electrical power and the amount of chemicals needed are also reduced.

The example above is given to illustrate the invention and should not be used to interpret the following claims limiting. The scope of the invention is not limited by the example give above, but the following claims. Modifications and amendments of the invention, being obvious to a person skilled of the art, should also be included in the scope of the invention.

The invention claimed is:

1. A system for treating and recycling process water, comprising a cylindrical sedimentation tank (1) and a cylindrical flotation tank (3) for flotation and storage downstream of the sedimentation tank (1), the sedimentation tank (1)

having an upper part with an inlet (6) for addition of water to be treated, and the flotation tank (3) includes a lower part with an outlet (13) for removal of treated water to be recycled, wherein
- the sedimentation tank (1) defines an inner diameter and includes a screw (2) having a shank and threads that define a crest that bears against an inner surface of the sedimentation tank, which forces the water to flow rotationally from a top towards a bottom of the sedimentation tank,
- a riser (7) is arranged inside the shank of the screw between the sedimentation tank (1) and the flotation tank (3) with a first end in a lower part of the sedimentation tank and an opposite second end in an upper part of the flotation tank,
- a cleaning loop is arranged between the sedimentation tank (1) and the flotation tank (3) for removing water from the flotation tank (3) and returning it to the sedimentation tank (1), and
- ozone is added to the loop.

2. The system according to claim 1, wherein an opening between the crest of the threads and the inside of the tank is sealed.

3. The system according to claim 1, wherein the first end of the riser is at a center of the rotational flow of water, proximate a lower part of the screw.

4. The system according to claim 2, wherein the first end of the riser is at a center of the rotational flow of water, proximate a lower part of the screw.

5. The system according to claim 1, wherein the riser (7) enters the flotation tank (3) at a bottom and runs through the centre of the flotation tank.

6. The system according to claim 2, wherein the riser (7) enters the flotation tank (3) at a bottom and runs through the centre of the flotation tank.

7. The system according to claim 3, wherein the riser (7) enters the flotation tank (3) at a bottom and runs through the centre of the flotation tank.

8. The system according to claim 1, wherein the ozone is added to the water in the cleaning loop via an injector (10).

9. The system according to claim 1, characterized in that the cleaning loop includes a tank (11) for homogenizing foam downstream of the position of addition of ozone.

10. The system according to claim 2, characterized in that the cleaning loop includes a tank (11) for homogenizing foam downstream of the position of addition of ozone.

11. The system according to claim 2, characterized in that the cleaning loop includes a tank (11) for homogenizing foam downstream of the position of addition of ozone.

12. The system according to claim 3, characterized in that the cleaning loop includes a tank (11) for homogenizing foam downstream of the position of addition of ozone.

13. The system according to claim 1, characterized in that one or both of foam and flotation sludge are removed at a top of the flotation tank.

14. A method for treating and recycling of process water from a washing area, using the system of claim 1, comprising the following steps:
- providing a process water prepared via a process,
- transferring the process water to the sedimentation tank (1),
- allowing the process water to rotate in the sedimentation tank (1), thereby allowing any particles in the process water to settle from the process water,
- allowing the process water to rise in the riser (7) from the sedimentation tank (1) to the upper part of the flotation tank (3),
- transferring a part of the water from the flotation tank to the cleaning loop,
- adding ozone to the water in the loop,
- returning the water to the upper part of the sedimentation tank (1), and
- recycling water from a lower part of the flotation tank to the process.

15. The method according to claim 14, comprising a step of allowing the water to foam in a foam reactor (11) after the ozone is added to the cleaning loop.

16. The method according to claim 14, wherein the water is collected in an oil and silt separator prior to transfer to the sedimentation tank.

17. The method according to claim 15, wherein the water is collected in an oil and silt separator prior to transfer to the sedimentation tank.

* * * * *

UNITED STATES PATENT AND TRADEMARK OFFICE
CERTIFICATE OF CORRECTION

PATENT NO. : 10,815,140 B2  
APPLICATION NO. : 16/307843  
DATED : October 27, 2020  
INVENTOR(S) : Björn Karlsen It is certified that error appears in the above-identified patent and that said Letters Patent is hereby corrected as shown below:

In the Claims

Column 8, Claim 10, Line 1:  
Delete "2" and insert --1--

Signed and Sealed this  
Ninth Day of March, 2021

Drew Hirshfeld  
*Performing the Functions and Duties of the*  
*Under Secretary of Commerce for Intellectual Property and*  
*Director of the United States Patent and Trademark Office*